United States Patent
Jakobi et al.

(10) Patent No.: US 10,003,577 B2
(45) Date of Patent: Jun. 19, 2018

(54) SECURE TRANSMISSION OF LOCAL PRIVATE ENCODING DATA

(71) Applicant: virtual solution AG, München (DE)

(72) Inventors: Thomas Jakobi, Ingolstadt (DE); Doris Hausen, Ottobrunn (DE); Frank Schmidberger, Ravensburg (DE)

(73) Assignee: virtual solution AG, München (DE)

( * ) Notice: Subject to any disclaimer, the term of this patent is extended or adjusted under 35 U.S.C. 154(b) by 138 days.

(21) Appl. No.: 15/013,322

(22) Filed: Feb. 2, 2016

(65) Prior Publication Data
US 2017/0180326 A1 Jun. 22, 2017

(30) Foreign Application Priority Data
Dec. 16, 2015 (EP) .................................. 15003586

(51) Int. Cl.
*H04L 29/06* (2006.01)
*H04W 12/04* (2009.01)

(52) U.S. Cl.
CPC ............ *H04L 63/04* (2013.01); *H04L 63/061* (2013.01); *H04W 12/04* (2013.01)

(58) Field of Classification Search
CPC .............................. H04L 63/04; H04L 63/061
See application file for complete search history.

(56) References Cited

U.S. PATENT DOCUMENTS

| | | | | |
|---|---|---|---|---|
| 7,593,579 B2* | 9/2009 | Gottwald | ................... | H04L 9/00 382/232 |
| 8,782,406 B2* | 7/2014 | Orre | ....................... | H04L 63/061 713/168 |
| 9,270,663 B2* | 2/2016 | Kravitz | .................... | H04L 9/006 |
| 9,413,766 B2* | 8/2016 | Larson | ................ | H04L 63/0876 |
| 9,521,130 B2* | 12/2016 | Short, III | ............ | H04L 61/1511 |
| 9,639,714 B1* | 5/2017 | Carlson | ............... | H04L 63/0428 |
| 9,729,522 B2* | 8/2017 | McCoy | .................. | H04L 9/3226 |
| 2004/0086118 A1* | 5/2004 | Sweetser | ................... | H04K 1/00 380/54 |
| 2005/0246527 A1* | 11/2005 | Gottwald | .................. | H04L 9/00 713/168 |
| 2007/0016781 A1* | 1/2007 | Asokan | ................. | H04L 9/0869 713/173 |
| 2007/0153794 A1* | 7/2007 | Smith | .................. | H04L 63/0414 370/390 |
| 2009/0287839 A1* | 11/2009 | Fallon | ..................... | G06Q 40/04 709/231 |
| 2011/0302408 A1* | 12/2011 | McDermott | ........ | H04L 63/0464 713/153 |
| 2013/0060708 A1* | 3/2013 | Oskolkov | .............. | G06Q 20/10 705/75 |

(Continued)

*Primary Examiner* — Ali Shayanfar
(74) *Attorney, Agent, or Firm* — Hanley, Flight & Zimmerman, LLC.

(57) ABSTRACT

A method of secure transfer of local private encoding data between a first communication device and a second communication device, the first communication device and the second communication device being operable to communicate with each other via a communication connection there between, a respectively adapted first communication device, a respectively adapted second communication device, a system comprising such first and second communication devices and also a computer program product for carrying out the above method.

15 Claims, 4 Drawing Sheets

(56) References Cited

U.S. PATENT DOCUMENTS

| | | | |
|---|---|---|---|
| 2013/0217336 A1* | 8/2013 | McCormack | H04B 7/00 455/41.2 |
| 2014/0096179 A1* | 4/2014 | Ben-Shalom | H04L 63/0869 726/1 |
| 2014/0278548 A1* | 9/2014 | Munro | G06F 19/3418 705/3 |
| 2014/0289826 A1* | 9/2014 | Croome | H04L 67/141 726/5 |
| 2015/0067819 A1* | 3/2015 | Shribman | H04L 67/06 726/12 |
| 2015/0082018 A1* | 3/2015 | Landais | H04L 9/0833 713/150 |
| 2015/0215291 A1* | 7/2015 | Abdunabi | G06F 21/6263 713/150 |
| 2016/0205139 A1* | 7/2016 | Davies | H04L 63/20 726/1 |

* cited by examiner

| | | | | |
|---|---|---|---|---|
| Use case 1 |  Socket, TLS  | | Smartphone | Desktop |
| Use case 2 |  Socket, TLS  | | Desktop | Smartphone |
| Use case 3 |  Socket, TLS  | | Smartphone | Tablet |
| Use case 4 |  Socket, TLS  | | Smartphone | Smartphone |
| Use case 5 |  Socket, TLS  | | Tablet | Tablet |
| Use case 6 |  Socket, TLS  | | Tablet | Desktop |
| Use case 7 |  Socket, TLS  | | Desktop | Tablet |
| Use case 8 |  Socket, TLS  | | Tablet | Smartphone |
| ... | | | ... | ... | ium
SECURE TRANSMISSION OF LOCAL PRIVATE ENCODING DATA

FIELD OF THE INVENTION

The present invention relates to secure encoded electronic communication and, particularly, to secure encoded e-mail communication of a user for different devices.

BACKGROUND OF THE INVENTION

Generally, secure e-mail communication is possible and available. To this end, for example, standards, like S/MIME, and methods, like PGP, are used to protect e-mails on their way from the sender to the receiver from, e.g., unauthorized access and manipulation.

However, the existing approaches are not widely used, for example in the field of non-business communication.

OBJECT OF THE INVENTION

It is an object of the present invention to provide solutions enabling a user-friendly way to establish secure e-mail communication.

SUMMARY OF THE INVENTION

According to an aspect of the present invention, there is provided a method of secure transfer of local private encoding data between a first communication device and a second communication device, the first communication device and the second communication device being operable to communicate with each other via a communication connection there between, the method comprising
  providing secure access information by the second communication device;
  transmitting the secure access information from the second communication device to the first communication device via a first secure communication path;
  establishing, based on the secure access information, the secure communication link between the first communication device and the second communication device on the communication connection between the first communication device and the second communication device.

According to another aspect of the present invention, there is a communication device, comprising
  a first communication interface being operable for communication with another communication device via a communication connection;
  a control unit being adapted to
    receive, via a first secure communication path, secure access information provided by the other communication device; and
    establish, based on the secure access information, the secure communication link to the other communication device on the communication connection to the other communication device.

According to another aspect of the present invention, there is provided a communication device, comprising
  a first communication interface being operable for communication with another communication device via a communication connection
  a control unit being adapted to provide secure access in a manner that the secure access information is adapted for transmission to the other communication device via a first secure communication path.

According to another aspect of the present invention, there is provided a system comprising a first communication device and a second communication device, wherein the first communication device is one of the above communication devices and the second communication device is the other one of the above communication devices.

According to another aspect of the present invention, there is provided a computer program product including program code configured to, when executed by a computing device, to carry out the steps of the above method.

BRIEF DESCRIPTION OF THE DRAWINGS

The description of examples following hereafter will be given with reference to the attached drawings, which show.

DETAILED DESCRIPTION

Figure 1:
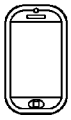
FIG. 1 a schematic illustration of exemplary use cases,
  FIG. 2 a schematic illustration of an exemplary communication device,
  FIG. 3 a schematic illustration of an exemplary scenario for a secure transfer of local private encoding data,
  FIG. 4 a schematic illustration of examples for a secure transfer of local private encoding data.
Figure 1:
Figure 1:
Figure 1:
Figure 1:
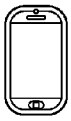
Figure 1:
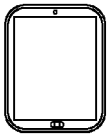
Figure 1:
Figure 1:
Figure 1:
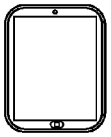
Figure 1:
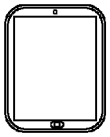
Figure 1:
Figure 1:
Figure 1:
Figure 1:
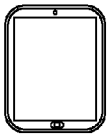
Figure 1:
Figure 1:

Various aspect will be described below by referring to the drawings. Features with similar properties or functions, which are shown in multiple figures, are referred to by the same reference numerals and will be explained upon their first mention.

However, before proceeding further with detailed descriptions of the drawings, further aspects are discussed.

In some examples of the method, the first communication device may have the local private encoding data, wherein the method may further comprise transferring the local private encoding data from the first communication device to the second communication device via the secure communication link on the communication connection; storing the received local private encoding data at the second communication device.

Such examples may be used in cases where the local private encoding data are located at the first communication device and the first communication device is capable of and/or adapted to obtain the secure access information in the form and/or way the secure access information is provided by the second communication device. Such cases include, e.g. that the second communication device provides the secure access information as visual/acoustic information and the first communication device has one or more units by means of which the visual/acoustic information can be obtained and/or inputted. For such examples, it can be said that the direction, in which the secure access information is provided, is opposite to the direction, in which the local private encoding data is provided.

In some examples of the method, the second communication device may have the local private encoding data, wherein the method may further comprise transferring the local private encoding data from the second communication device to the first communication device via the secure communication link on the communication connection; storing the received local private encoding data at the first communication device.

Such examples may be used in cases where the local private encoding data are located at the second communication device and the second communication device is not capable of and/or adapted to obtain the secure access information in the form and/or way the secure access information is provided by the first communication device. Such cases include, e.g. that the first communication device provides the secure access information as visual/acoustic information and the first communication device has no unit by means of which the visual/acoustic information can be obtained and/ or inputted. For such examples, it can be said that the direction, in which the secure access information is provided, and the direction, in which the local private encoding data is provided, are the same.

In some examples of the method, in the case the first communication device has the local private encoding data, the first communication device may be operated as a client device and the second communication device may be operated as a server device.

In some examples of the method, in the case the second communication device has the local private encoding data, the first communication device may be operated as a server device and the second communication device may be operated as a client device.

In some examples, the method may further comprise verifying the secure communication link via a second secure communication path.

In some examples of the method, the local private encoding data may comprise at least one of a public encoding key associated to one of the first communication device and the second communication device, a private encoding key of one of the first communication device and the second communication device, a public encoding key certificate of one of the first communication device and the second communication device, a symmetric encoding key of one of the first communication device and the second communication device, a symmetric HMAC key of one of the first communication device and the second communication device.

In some examples of the method, at least one of the first communication device and the second communication device may comprise at least one of a personal computer, a portable communication device, a laptop computer, a mobile telephone, a smart phone, an embedded device, a router, a smart watch, a wearable computer.

In some examples of the method, the communication connection between the first communication device and the second communication device may include at least one of a wired connection, a wired communication network, a wireless communication network, a USB connection, a Bluetooth connection, an I2C connection, a FlexRay connection, a CAN Bus connection, a Firewire/Thunderbolt connection, In some examples of the method, the secure access information may include at least one of a public encoding key, an IP address of the second communication device, a physical access interface, a UDP port of the second communication device, a Bluetooth device ID of the second communication device.

In some examples of the method, the transmitting the secure access information via the first secure communication path may include at least one of displaying the secure information by means of the second communication device and acquiring the displayed secure information by means of the first communication device, a user personally obtaining the secure access information from the second communication device and inputting the obtained secure access information into the first communication device, transmitting the secure access information via a communication link physically separated from the communication connection between the first communication device and the second communication device, providing the secure access information by means of a remote storage device accessible by the first communication device and/or a user of the first communication device.

In some examples of the method, the establishing the secure communication link may comprise at least one of establishing an encoded connection between the first communication device and the second communication device, particularly a TLS connection, for secure communication by means of unencoded data or encoded data, establishing an unencoded connection between the first communication device and the second communication device, particularly a TCP connection, for secure communication by means of encoded data.

In some examples of the method, the establishing the secure communication link may comprise at least one of establishing a tunneled communication connection between the first communication device and the second communication device, negotiating a symmetric key encryption between the first communication device and the second communication device, establishing a TLS connection between the first communication device and the second communication device; or the establishing the secure communication link comprises at least one of establishing a TCP connection between the first communication device and the second communication device.

In some examples of the method, the verifying the secure communication link via a second secure communication path may include at least one of verifying, at the first communication device, identification information provided by the second communication device to the first communication device, providing identification information at the second communication device and reproducing the identification information at the first communication device, confirming, by a user, identification information from the second communication device and provided at the first communication device to the user.

In some examples of the method, the identification information may be provided by at least one of displaying the identification information by means of the second communication device and acquiring the displayed identification information by means of the first communication device, a user personally obtaining the identification information from the second communication device and inputting the obtained identification information into the first communication device, transmitting the identification information via a communication link physically separated from the communication connection between the first communication device and the second communication device, providing the identification information by means of a remote storage device accessible by the first communication device and/or a user of the first communication device.

In some examples, the method may further comprise encoding the local private encoding data at that communication device of the first communication device and the second communication device having the local private encoding data, transmitting the encoded local private encoding data from said communication device of the first communication device and the second communication device to the respective other of the first communication device and the second communication device, storing the encoded local private encoding data at said respective other of the first communication device and the second communication device.

In some examples of the method, the storing the received encoded local private encoding data may include decoding the received encoded local private encoding data at said respective other of the first communication device and the second communication device, storing the decoded local private encoding data in an encoding data memory unit of said respective other of the first communication device and the second communication device.

In some examples of the preceding aspect, the communication device may further comprise a data memory unit comprising local private encoding data, wherein the control unit may be further adapted to transfer the local private encoding data to the other communication device via a secure communication link on the communication connection.

In some examples of the preceding aspect concerning a communication device, the control unit may be further adapted to encode the local private encoding data before its transfer to the other communication device, and transfer the encoded local private encoding data to the other communication device via a secure communication link on the communication connection.

In some examples of the preceding aspect, the communication device may be operated as a client device in relation to the other communication device that may be operated as a server device.

In some examples of the preceding aspect, the communication device may further comprise a first communication interface being operable for communication the other communication device via the communication connection; a memory unit being adapted to store local private encoding data of the other communication device transferred therefrom via the secure communication link on the communication connection.

In some examples of the preceding aspect concerning a communication device, the control unit may be further adapted to decode encoded local private encoding data of the other communication device transferred therefrom in encoded form via the secure communication link on the communication connection.

In some examples of the preceding aspect, the communication device may be operated as a server device in relation to the other communication device that may be operated as a client device.

In some examples of the preceding aspect concerning a communication device, the local private encoding data may comprise at least one of a public encoding key, a private encoding key, a public encoding key certificate, a symmetric encoding key, a symmetric HMAC key.

In some examples of the preceding aspect, the communication device may comprise at least one of a personal computer, a portable communication device, a laptop computer, a mobile telephone, a smart phone, an embedded device, a router, a smart watch, a wearable computer.

In some examples of the preceding aspect concerning a communication device, the secure access information may include at least one of a public encoding key, an IP address of the other communication device, a physical access interface, a UDP port of the second communication device, a Bluetooth device ID of the second communication device.

In some examples of the preceding aspect, the communication device may further comprise at least one of a data capturing unit being adapted to capture at least one of visual and audio information provided by the other communication device, wherein the control unit is adapted to control capturing, by means of the data capturing unit, the secure information as provided by the other communication device, a data input unit being to receive input from a user, wherein the control unit is adapted to process user input, which is received by means of the data input unit and comprises the secure access information from the other communication device, a communication interface being operable for communication with the other communication device via a communication link physically separated from the communication connection to the other communication device.

In some examples of the preceding aspect concerning a communication device, the control unit may be adapted to establish the secure communication link by means of at least one of establishing an encoded connection between the first communication device and the second communication device, particularly a TLS connection, for secure communication by means of unencoded data or encoded data, establishing an unencoded connection between the first communication device and the second communication device, particularly a TCP connection, for secure communication by means of encoded data.

In some examples of the preceding aspect concerning a communication device, the control unit may be adapted to establish the secure communication link by means of at least one of establishing a tunneled communication connection to the other communication device, negotiating a symmetric key encryption to the other communication device, establishing a TLS connection to the other communication device; or establishing a TCP connection to the other communication device.

In some examples of the preceding aspect concerning a communication device, the control unit may be adapted to establish the secure communication link by means of at least one of establishing a tunneled communication connection to the other communication device, negotiating a symmetric key encryption with the other communication device, establishing a TLS connection to the other second communication device; or establishing a TCP connection between the first communication device and the other communication device.

In some examples of the preceding aspect concerning a communication device, the control unit may be adapted to verify the secure communication link by means of at least one of verifying identification information provided by the other communication device, reproducing identification information provided by the other communication device.

The illustrated examples assuming a secure transfer of local private encoding data from a first communication device in the form of a mobile communication terminal (e.g. mobile telephone, smart phone, tablet, laptop, etc.) to a second communication device in the form of a stationary communication terminal (e.g. desktop computer, etc.).

However, such a scenario is just exemplary. Secure transfer of local private encoding data in terms of the present disclosure can take place between any types of communication device, by means of which encoded electronic communication is possible. FIG. 1 illustrate some exemplary use cases, namely secure transfer of local private encoding data in terms of the present disclosure from a smartphone to a desktop computer (use case 1), from a desktop computer to a smartphone (use case 2), from a smartphone to a tablet (use case 3), from a smartphone to a smartphone (use case 4), from a tablet to a tablet (use case 5), from a tablet to a desktop (use case 6), from a desktop to a tablet (use case 7), from a tablet to a smartphone (use case 8), etc.

Examples of electronic communication particularly include e-mail communication. Encoded electronic communication particularly includes communication, where data communicated from a sending communication device to a receiving communication device is encoded by a private encoding key only known to the sending communication device. In more specific examples, the sending communication device may use a private encoding a key only known to the first communication device and a public encoding key shared by the sending communication device and the second communication device. Further, such encoded electronic communication may also include using a digital signature to demonstrate the authenticity of the data to be communicated between the sending and receiving communication devices and the authenticity of the sender of that data. Known implementations in these regards comprise, inter alia, S/MIME and PGP.

In some examples, the first communication device be referred to as client device and the second communication device can be referred to as server device to indicate that the secure transfer of local private encoding data is initiated by the first communication device and that the first communication device is the communication device having the local private encoding data.

Figure 2:
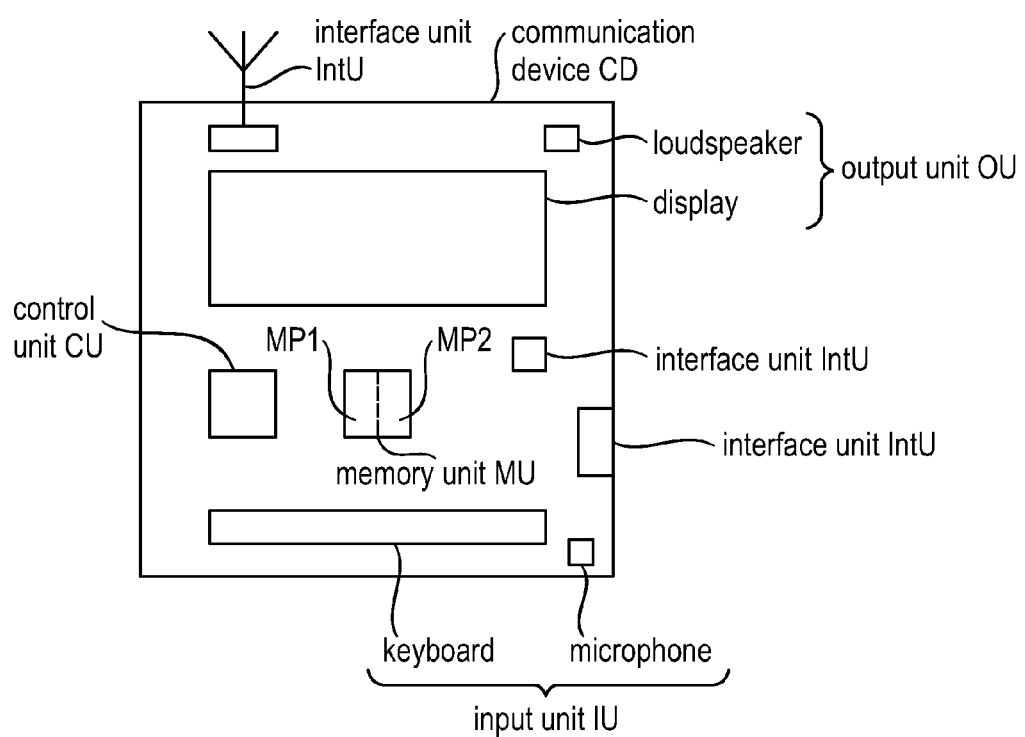

FIG. 2 illustrates an example of a communication device CD usable for secure transfer of local private encoding data in terms of the present disclosure. As illustrated, the communication device CD comprises a control unit CU (e.g. a processor), a memory unit MU, an output unit OU, an input unit IU and at least one interface unit IntU.

The control unit CU may include one or more, for example, processors, ASIC, FPGA, SoC as well as software.

The memory unit MU may include a memory part MP1 for storing an operating system and other software for operation of the communication device CD. The memory unit MU may include a memory part MP2 for storing data comprising, for example, data usable by the operating system and/or the other software in the memory part MP1 for operation of the communication device CD. Particularly, the memory unit MU may be for storing locally private encoding data of the communication device CD.

The output unit OU may comprise a display unit DU for providing visual information to a user of the communication device CD. The display unit DU may comprise, e.g., a LCD or TFT display and respective further hardware and software components. The display unit DU may comprise a touch-sensitive display adapted to act as output component and, as described below, also as input component.

The output unit OU may comprise an audio unit AU for providing audio/sound information to a user of the communication device CD. The audio unit AU may comprise, e.g., a loudspeaker and respective further hardware and software components.

The output unit OU may be part of a first communication device and may be used, for example, to provide verification information received from a second communication device to a user of the first communication device.

The output unit OU may be part of a second communication device and may be used, for example, to provide secure access information to a user of a first communication device and/or verification information, which has been communicated to a first communication device, to a user of the first communication device.

The input unit IU may comprise at least one of a keyboard for manual user input, a microphone for audio/sound user input, a touch-sensitive input area for manual user input, and an image/video camera. The touch-sensitive input area may be provided as separate input component or may be provided as part of the output unit OU, for example, in form of a touch-sensitive display.

The input unit IU may be part of a first communication device and may be used, for example, to input, into the first communication device, secure access information provided by a second communication device.

The input unit IU may be part of a second communication device and may be used, for example, to input, into the second communication device, verification information provided at a first communication device to a user thereof.

The at least one interface unit UI may comprise, in addition to possible respective further hardware and software, an interface for communication via a wired network including, e.g., a RJ-45 port, I2C pins, GPIO pins, a port for an optical/fiber-optical cable, etc. Such an interface may be particularly used for a communication connection used for secure transfer of local private encoding data. Such an interface unit UI may be adapted for direct connection with a wired network (e.g. wire Local Area Network, the Internet) and/or indirect connection with a wireless network over an intermediate wired network, in order to, for example, enable communication with another communication device CD. Such an interface unit UI may be used, for example, for a secure transfer of local private encoding data from a first communication device to a second communication device.

The at least one interface unit UI may comprise, in addition to possible respective further hardware and software, an interface for wireless communication via, e.g., a mobile communication network (e.g. GSM, UMTS, LTE, . . . ), a Wireless Local Area Network W-LAN, etc. Such an interface may be particularly used for a communication connection used for secure transfer of local private encoding data. Such an interface unit UI may be adapted for direct connection with a wireless network and/or indirect connection with a wired network over an intermediate wireless network, in order to, for example, enable communication with another communication device CD. Such an interface unit UI may be used, for example, for a secure transfer of local private encoding data from a first communication device to a second communication device.

The at least one interface unit UI may comprise, in addition to possible respective further hardware and software, an interface for short-range wireless communication in form of Bluetooth data communication, Near Field Communication NFC, ZigBee communication, communication according to other ISM band protocols (e.g. 6LOWPAN etc.), etc. Such an interface may be particularly used for a communication link used in connection with secure access information and/or verification of such a communication link. Such an interface unit UI may be adapted for direct connection with another communication device CD. Such an interface unit UI may be used, for example, to provide secure access information from a second communication device to a first communication device and/or verification information to be provided from a first communication device to a second communication device. Such an interface may be used in connection with one or more connection links between a first communication device and a second communication device being physically separated from the communication connection.

Figure 3:
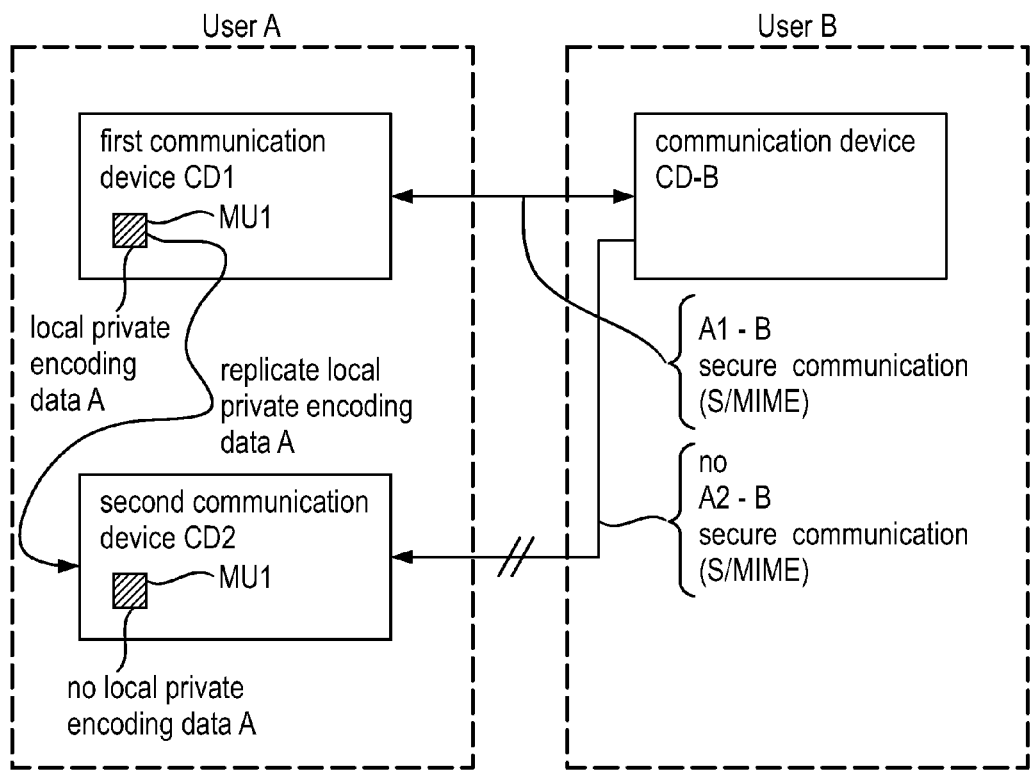

FIG. 3 illustrates an exemplary approach for a user to enable secure communication between a communication device of the user and the communication device of another user.

Assume a user A having a first communication device CD1 and a second communication device CD2, and a user B having a communication device CD-B. For the illustrated scenario, it is further assumed that the secure communication should be secure e-mail communication and that e-mail communication should be encoded according to S/MIME.

For S/MIME e-mail communication, the first communication device CD1 uses a pair of encoding keys, namely a private key and a public key embedded in a certificate. Generally, the private and public keys and the certificate are associated to a user, here user A. Thus, the private and public keys and the certificate can be referred to a private encoding data A.

Generally such private encoding data are locally stored in the communication device (or associated in another way thereto), to which the private encoding data is associated and/or in which the private encoding data has been generated. In FIG. 3, this is illustrated by a "filled" memory unit MU1 holding, inter alia, the private encoding data A. Thus, such private encoding data (e.g. a pair of private and public keys and a certificate) can be referred to as local private encoding data.

As illustrated, the first communication device CD1 has such local private encoding data A and, thus, can securely communicate with the communication device CD-B of the user B.

As assumed, the private encoding data are logically associated to a user (user A) and, thus, could be used by that user (user A) for secure communication with any of the user's communication devices (assuming a respective capability for secure communication). However, the private encoding data are available to the user only as local private encoding data; in other words, it can be said that the private encoding data are "physically bound" to the first communication device CD1.

As illustrated in FIG. 3, the second communication device CD2 has no private encoding data A and, thus, is not adapted for secure communication. In FIG. 3, this is illustrated by an "empty" memory unit MU2 not including the private encoding data A For secure communication by means of the second communication device CD2 using the same private encoding data, user A is required to "replicate" the private encoding data from its localization at the first communication device CD1 to the second communication device CD2. This illustrated in FIG. 3 by the line between the memory unit MU1 and the memory unit MU2.

Such a "data replication" should meet several requirements. For example, "replicating" the private encoding data should be easy for the user and, also, should be secure so that, e.g., no third party is able to get access to the private encoding data while being "replicated" from a communication device to another.

Figure 4:
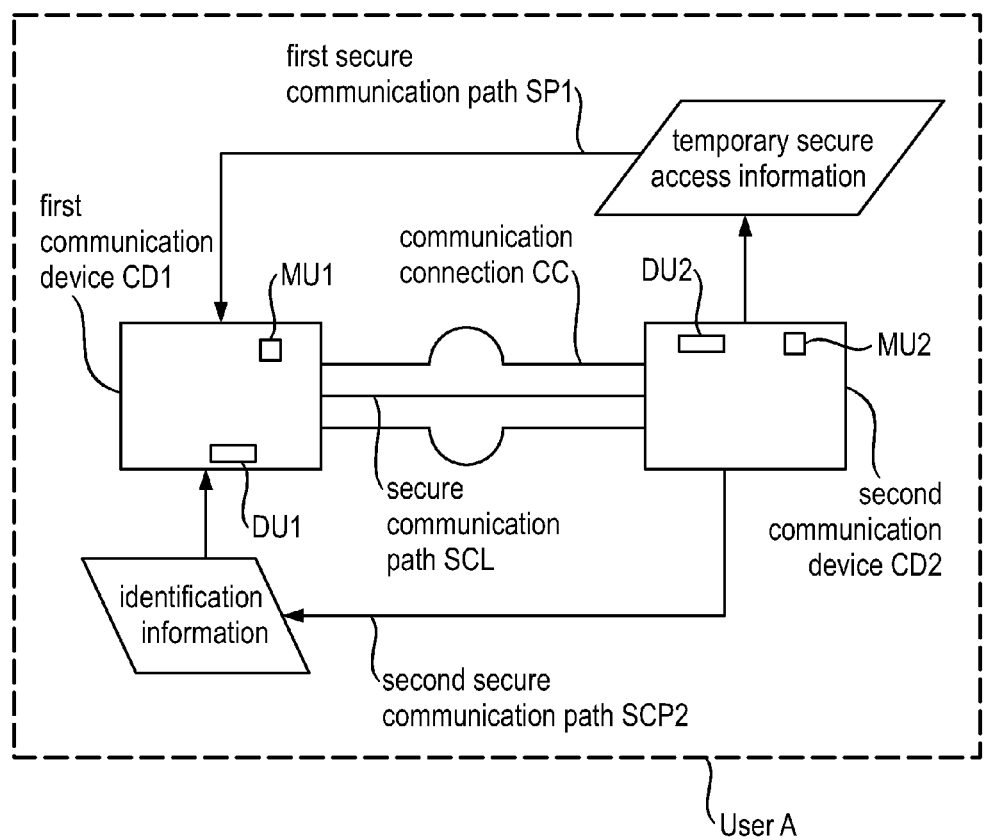

As regards such a "replication", FIG. 4 schematically illustrates examples of a secure transfer of local private encoding data.

As in the case of FIG. 3, a first communication device CD1 has private encoding data locally stored in a memory unit MU1, while a second communication device CD2 does not have the private encoding data in its memory MU2, yet.

First communication device CD1 and second communication device CD2 have access to a communication connection CC, by means of which they can communicate with each other. The communication connection CC may include transmission mechanism capable of data transmission between communication devices, like a wired local area network, a wireless local area network (including, e.g., WLAN, Bluetooth, NFC, etc.), the Internet, a mobile/cellular communication environment, etc. and combinations thereof.

In the illustrated example, it is assumed the first communication device CD1 and the second communication device CD2 may communicate via a communication connection CC comprising a wireless local area network (e.g., at least one of WLAN, Bluetooth, NFC, etc.) including, inter alia, a respective router.

Following the conventional designation of communication devices as server and client, the first communication device CD1 may be considered as client and the second communication device CD2 may be considered as server device.

The behavior of the second communication device CD2, including its hardware and software functions and steps, may be controlled by a software application executed on the second communication device CD2

In response to a user initiating a transfer of the private encoding data from the first communication device CD1 to the second communication device CD2, the latter generates secure access information. The secure access information is information for the first communication device CD1 how to establish a secure communication link SCL to the second communication device CD2.

The secure access information can be temporary secure access information that may be used, for example, just once.

For the present example, it is assumed that the secure access information includes a pair of encoding keys, particularly a public encoding key and a private encoding key both being associated to the second communication device CD2.

The pair of encoding keys or at least one of the public encoding key and the private encoding key of the secure access information may be temporary.

Further, for the present example, it is assumed that the secure access information also includes information how the first communication device CD1 can address/reach the second communication device CD2 as such. Such information can be referred to as hardware access information. Here, it is assumed that such information includes, for example, the IP address of the second communication device CD2 and a port of the second communication device CD2 to be used by the first communication device CD1, a Bluetooth device ID, etc.

The secure access information is provided by the second communication device CD2 such that the secure access information can be securely "brought" to the first communication device CD1. To this end, a first secure communication path SCP1 is used.

The term "path" in secure communication path SCP particularly indicates a communication relation that may include technical components and user intervention. A secure communication path may be considered as communication means specifically associated to the first communication device CD1 and the second communication device CD2 only established for a specific communication purpose. However, for example in contrast to a communication link or communication connection, a communication path may comprise not only technical communication components (e.g. wired and/or wireless), but also user intervention in relation to "bringing information" from the first communication device CD1 to the second communication device CD2 and vice versa. Participation of the user in the first communication path SCP1 is helpful in so far as the user can be considered as a very or even as the utmost reliable security component for relaying his/her own information.

For example, the second communication device CD2 may display secure access information on its display DU2 so that the user can visually obtain the displayed information. In such cases, the secure access information is transferred by the user—so to say—"manually" to the first communication device CD1, by inputting the obtained information via a the input unit IU1 of the first communication device CD1. The secure communication path used in this respect (also referred to as first communication path SCP1) would comprises the display unit DU2 of the second communication device CD2, the user and the input unit IU1 of the first communication device CD1.

In further examples, the second communication device CD2 may generate a displayable code (for example a QR code or a derivate thereof, a barcode, etc.) including the secure access information and display the displayable code on its display unit DU2. In such cases, the displayable code may be acquired by means of an image/video camera (see FIG. 2) of the first communication device CD1 and, as a result, provided to the first communication device CD1. The secure communication path used in this respect (also referred to as first communication path SCP1) would comprises the display unit DU2 of the second communication device CD2 and the image/video camera of the first communication device CD1. However, also in such cases, the user can be considered as part of the first secure communication path SCP1 because the user is required to acquire the secure access by means of the image/video camera of the first communication device CD1.

In further examples, the second communication device CD2 may establish a (temporary) first communication link CD1 being physically and/or logically separated from the communication connection CC. For example, a Bluetooth link or NFC link may be established between the second communication device CD2 and the first communication device CD1, which link is then used only to send the secure access information to the first communication device CD1. The secure communication path used in this respect (also referred to as first communication path SCP1) would comprises a respective interface unit IntU2 of the second communication device CD2 and respective interface unit IntU1 of the first communication device CD1 as well as the first communication link CL1 there between. However, also in such cases, the user can be considered as part of the first secure communication path SCP1 because the user is required to set-up the first communication link CL1, for example, by bringing the first communication device CD1 and the second communication device CD2 into (close) proximity required for a, e.g., NFC link.

In some examples, it may be possible that a communication device having local private encoding data is not capable of and/or adapted to obtain secure access information from another communication device to which the local private encoding data are to be replicated due to the way the other communication device provides the secure access information. Such examples include that the other communication device can display secure access information while the communication device having local private encoding data has no input unit to input the secure access information, or that the other communication device can display secure access information in form of a displayable code while the communication device having local private encoding data has no image/video camera to acquire the secure access information. Then, it is possible that the secure access information is provided by the communication device having local private encoding data and that the communication device to which the local private encoding data are to be replicated is the communication device receiving the secure access information. For such examples, it can be said that the direction, in which the secure access information is provided, and the direction, in which the local private encoding data is provided, are the same.

Upon receipt of secure access information at the first communication device CD1, the first communication device CD1 uses the secure access information to establish a secure communication link SCL with the second communication device CD2 on the communication connection CC.

"On the communication connection CC" particularly indicates that the secure communication link SCL may be established by using physical parts of the communication connection CC, like its wired and/or wireless components. For example, assuming a communication connection CC including a wired connection between the first communication device CD1 and the second communication device CD2 (e.g. between a respective interface of the first communication device CD1 and a respective interface of the second communication device CD2 via intermediate wired connections (e.g. the Internet)), than the secure communication link SCL may be established via these components. For example, assuming a communication connection CC including a wireless connection between the first communication device CD1 and the second communication device CD2 (e.g. between a respective interface of the first communication device CD1 and a respective interface of the second communication device CD2 via an intermediate wired connection (e.g. a W-LAN)), then the secure communication link SCL may be established via these components.

The term "link" in secure communication link particularly indicates a technical communication relation between the first communication device CD1 and the second communication device CD2 being "closer" as compared with, for example, the communication connection CC. The secure communication link SCL may be considered as communication means specifically associated to the first communication device CD1 and the second communication device CD2 only and established for a specific communication purpose.

A secure communication link SCL can be established in the form of, for example, a TLS connection, or a TCP connection, where transport data (here the local private encoding data) are encoded, while the transport thereof is not encoded.

For the above-assumed example of secure access information including public encoding keys as well as hardware access information, a secure communication link SCL can be established in form of a TLS connection, as described below.

The first communication device CD1 sets up, by using the hardware access information, a hardware connection (e.g. a socket connection) with the second communication device CD2 over the communication connection CC and initiates a TLS connection via the hardware connection by using the pair of encoding keys.

A TLS connection may require, inter alia, that the first communication device CD1 also generates a pair of encoding keys, which includes a public key and a private key associated to the first communication device CD1. This pair of encoding keys or at least one of this public encoding key and his private encoding key of the secure access information may be temporary.

The first communication device CD1 sends its public key to the second communication device CD2. Then, the first communication device CD1 and the second communication device CD2 determine a so-called shared secret on the basis of the respective own pair of encoding keys and the public key of the respective other communication device. The shared secret is used to derive a cryptographic key, which is used to encode all further communication between the first communication device CD1 and the second communication device CD2 via the secure communication link SCL.

For an enhanced security, the secure communication link SCL may be verified via a second secure communication path. The second secure communication path may correspond with the above first secure communication part, may or may differ therefrom.

Verification of the secure communication link SCL may comprise sending an (unique) identification feature from the second communication device CD2 to the first communication CD1 via the secure communication link SCL. The identification feature may comprise, for example, number(s), letter(s), punctuation mark(s), symbol(s) (e.g. like a login password), graphic(s) (e.g. an image, picture, video), voice and/or sound, and any combination thereof.

Depending on its type, the way the identification information is provided may differ. In the case of identification information that can perceived visually by the user, such identification information may be displayed at a display unit DU1 of the first communication device CD1. In the case of identification information that can perceived acoustically by the user, such identification information may be outputted by means of an audio unit AU1 of the first communication device CD1.

In a comparable manner, identification information that can perceived visually by the user may be displayed at the display unit DU2 of the second communication device CD2 and/or identification information that can perceived acoustically by the user may be outputted by means of an audio unit AU2 of the first communication device CD2.

Verification of the secure communication link SCL may include verifying that the identification information as generated by the second communication device CD2 and the identification information as received by the first communication device CD1 via the secure communication link SCL are the same or, in other words, that the identification information as generated by the second communication device CD2 has been reached in the first communication device CD1 uncorrupted. Simply spoken, the identification information at the first communication device CD1 and the identification information at the second communication device CD2 are compared and, in the case, there is no difference, it can be said that the secure communication link SCL is uncorrupted.

While the identification information is transmitted from the second communication device CD2 to the first communication device CD1 via the secure communication link SCL, the verification of the secure communication link SCL takes place on a second secure communication path SCP2. In order to avoid that something, which has rendered the secure communication link SCL insecure (e.g. an human and/or machine intruder; "man-in-the-middle" attack), may also have the possibility to gain unauthorized access to the second secure communication path SCP2, the second secure communication path SCP2 is separated from the secure communication link SCL.

It should be noted that the first secure communication path SCP1 with respect to the secure access information and the second secure communication path SCP2 described with respect to the verification may be the same or may differ.

Like in the case of the first secure communication path SCP1, the second secure communication SCP2 can comprise the user, which can be considered as a very or even the utmost reliable security component for relaying his/her own information.

For example, the second communication device CD2 may display identification information on its display DU2 so that the user can visually obtain that displayed information, while the first communication device CD1 displays the identification information as received via the secure communication link SCL from the second communication device CD1 on its display unit DU1 so that the user can visually obtain that displayed information also. As a result, the user can compare the identification information on the display unit DU1 and the identification information on the display unit DU2 and, if they are the same, can verify that the secure communication link SCL is secure, for example, by inputting respective information into at least one of the first communication device CD1 and the second communication device CD2. Then, the first communication device CD1 and the second communication device CD2 can be considered as securely connected. If the identification information on the display unit DU1 and the identification information on the display unit DU2 are not the same, the user can input respective information into at least one of the first communication device CD1 and the second communication device CD2 to indicate that the secure communication link SCL is not secure and, for example, should not be used and/or terminated. In such cases, the secure communication link SCL is so to say "manually" verified by the user. The secure communication path SCP2 used in this respect would comprises the display unit DU1 of the second communication device CD1, the display unit DU2 of the second communication device CD2 and the user.

In further examples, the second communication device CD2 may display identification information on its display DU2 so that this displayed information may be acquired by means of an image/video camera of the first communication device CD1. The first communication device CD1 compares the identification information as received from the second communication device CD2 via the secure communication link SCL and the identification information acquired from the display unit DU2 and, if they are the same, can verify that the secure communication link SCL is secure. In addition, the first communication device CD1 may provide the user with information that the verification was successful and the user may input respective information into the second communication device CD2 in order to inform also the second communication device CD2 that the verification was successful. Then, the first communication device CD1 and the second communication device CD2 can be considered as securely connected. If the identification information at the first communication device CD1 as received from the second communication device CD2 via the secure communication link SCL and the identification information acquired from the display unit DU2 are not the same, the first communication device CD1 determines that the secure communication link SCL is not secure and that the verification was not successful, for example, followed by shutting down the secure communication link SCL. In addition, the first communication device CD1 may provide the user with information that the verification was not successful and the user may input respective information into the second communication device CD2 in order to inform also the second communication device CD2 that the verification was not successful. The secure communication path SCP2 used in this respect would comprises the display unit DU2 of the second communication device CD2, the image/video camera of the first communication device CD1 and the user, which is required to acquire the identification information on the display unit DU2 of the second communication device CD2 by means of the image/video camera of the first communication device CD1.

In further examples, identification information may be brought from the second communication device CD2 to the first communication device CD1 via a (temporary) second communication link CL2 being physically and/or logically separated from the communication connection CC. For example, a Bluetooth link or NFC link may be established between the second communication device CD2 and the first communication device CD1, which link CL2 is then used only to send the identification information to the first communication device CD1.

The first communication device CD1 compares the identification information as received from the second communication device CD2 via the secure communication link SCL and the identification information received via the second communication link CL2 and, if they are the same, can verify that the secure communication link SCL is secure. In addition, the first communication device CD1 may provide the user with information that the verification was successful and the user may input respective information into the second communication device CD2 in order to inform also the second communication device CD2 that the verification was successful. Then, the first communication device CD1 and the second communication device CD2 can be considered as securely connected. If the identification information as received from the second communication device CD2 via the secure communication link SCL and the identification information received via the communication link are not the same, the first communication device CD1 determines that the secure communication link SCL is not secure and that the verification was not successful, for example, followed by shutting down the secure communication link SCL. In addition, the first communication device CD1 may provide the user with information that the verification was not successful and the user may input respective information into the second communication device CD2 in order to inform also the second communication device CD2 that the verification was not successful. The secure communication path SCP2 used in this respect would comprises a respective interface unit IntU2 of the second communication device CD2 and respective interface unit IntU1 of the first communication device CD1 as well as the second communication link CL2 there between. However, also in such cases, the user can be considered as part of the second secure communication path SCP2 because the user is required to set-up the second communication link CL2, for example, by bringing the first communication device CD1 and the second communication device CD2 into (close) proximity required for a, e.g., NFC link.

It should be noted that the first communication link CL1 described with respect to the secure access information and the second communication link CL2 described with respect to the verification may be the same or may differ.

Like with secure access information, in some examples, it may be possible that a communication device having local private encoding data is not capable of and/or adapted to obtain identification information from another communication device to which the local private encoding data are to be replicated due to the way the other communication device provides the identification information. Such examples include that the other communication device can display identification information while the communication device having local private encoding data has no input unit to input the identification information. Then, it is possible that the identification information is provided by the communication device having local private encoding data and that the communication device to which the local private encoding data are to be replicated is the communication device receiving the identification information. For such examples, it can be said that the direction, in which the identification information is provided, and the direction, in which the local private encoding data is provided, are the same.

Using the verified secure communication link SPL, the first communication device CD1 transfers its local private encoding data to the second communication device CD2. Assuming a secure communication link SCP in form of a TLS connection, transfer of the local private encoding data includes, inter alia, that the first communication device CD1 brings the local private encoding data into a respective transport standard, e.g. PKCS#12, encodes the resulting transport data by a transport PIN received from the second communication device CD2 and sends the resulting encoded transport data over the secure communication link SCL to the second communication device CD2.

Having received the encoded transport data from the first communication device CD1, the second communication device CD2 retrieves the local private encoding data of the first communication device CD1 and stores the same in its memory unit MU2. As a result, the local private encoding data of the first communication device CD1 are now locale private encoding data of the second communication device CD2, also.

The local private encoding data now stored at the second communication device CD2 are now available at the second communication device CD2 for applications requiring the same. For example, the local private encoding data may be (automatically) used to implement an S/MIME configuration for an e-mail application of the second communication device CD2. Such an implementation may be used also for other private encoding data, which the second communication device CD2 has received in a different way.

This application claims priority to European Patent Application 15 003 586.3, filed Dec. 16, 2015, the entire content of which is hereby expressly incorporated herein by reference.

| Reference Numeral List | |
|---|---|
| Communication device | CD |
| Communication device 1 | CD1 |
| Communication device 2 | CD2 |
| Communication device of user B | CD-B |
| Control unit | CU |
| Memory unit | MU |
| Memory unit 1 | MU1 |
| Memory unit 2 | MU2 |
| Output unit | OU |
| Output unit 1 | OU1 |
| Output unit 2 | OU2 |
| Input unit | IU |
| Input unit 1 | IU1 |
| Input unit 2 | IU2 |
| Interface unit | IntU |
| Memory part | MP |
| Memory part 1 | MP1 |
| Memory part 2 | MP2 |
| Display unit | DU |
| Display unit 1 | DU1 |
| Display unit 2 | DU2 |
| Audio unit | AU |
| Audio unit 1 | AU1 |
| Audio unit 2 | AU2 |
| Communication connection | CC |
| Secure communication link | SCL |
| First secure communication path | SCP1 |
| Second secure communication path | SCP2 |
| First communication link | CL1 |
| Second communication link | CL2 |

The invention claimed is:

1. A method of secure transfer of local private encoding data between a first communication device having a first interface unit and a second communication device having a second interface unit, the first communication device and the second communication device being configured to communicate with each other via a communication connection there between, the method comprising:
  providing secure access information by the second communication device;
  transmitting the secure access information from the second communication device to the first communication device via a first secure communication path, the first secure communication path comprising the second interface unit and the first interface unit and being physically and/or logically separated from the communication connection, wherein the transmitting comprises:
    displaying or sending, by the second interface unit, of the secure access information; and
    acquiring or receiving, by the first interface unit, of the secure access information;
  establishing, based on the secure access information, a secure communication link between the first communication device and the second communication device on the communication connection between the first communication device and the second communication device; and
  transferring the local private encoding data via the secure communication link on the communication channel between the first communication device and the second communication device.

2. A method according to claim 1,
wherein the first communication device has the local private encoding data, wherein the transferring of the local private encoding data is from the first communication device to the second communication device, the method further comprising:
  storing the received local private encoding data at the second communication device.

3. A method according to claim 1, wherein the second communication device has the local private encoding data, wherein the transferring the local private encoding data is from the second communication device to the first communication device, the method further comprising:
  storing the received local private encoding data at the first communication device.

4. A method according to claim 1, further comprising:
  verifying the secure communication link via a second secure communication path.

5. A method according to claim 1, wherein the local private encoding data includes one of the following: a public encoding key, a private encoding key, a public encoding key certificate, a symmetric encoding key, a symmetric HMAC key.

6. A method according to claim 1, wherein the secure access information includes one of the following: a public encoding key, an IP address of the other communication device, a physical access interface, a UDP port of the second communication device, a Bluetooth device ID of the second communication device, a displayable code.

7. A method according to claim 1, wherein the second interface unit comprises a display unit of the second communication device, wherein the first secure communication path comprises the display unit and wherein the transmitting comprises displaying, by the display unit, of the secure access information.

8. A method according to claim 1, wherein the first interface unit comprises an input unit or an image/video camera and wherein the transmitting comprises acquiring the secure access information.

9. A method according to claim 1, wherein the secure communication link comprises one of the following: a TCP connection, a TLS connection.

10. A communication device, comprising:
  a first communication interface configured to communicate with another communication device via a communication connection;
  a processor configured to:
    receive or acquire, via a first interface unit and a first secure communication path being physically and/or logically separated from the communication connection, secure access information provided by the other communication device;
    establish, based on the secure access information, a secure communication link to the other communication device on the communication connection to the other communication device; and
    transfer local private encoding data to the other communication device via the secure communication link on the communication connection.

11. A communication device according to claim 10, further comprising:
  a data memory unit comprising the local private encoding data to be transferred.

12. A communication device according to claim 10, further comprising:
  a memory unit being configured to store local private encoding data of the other communication device transferred therefrom via the secure communication link on the communication connection.

13. A communication device according to claim 10, wherein the processor is configured to verify the secure communication link by means of at least one of:
  verifying identification information provided by the other communication device,
  reproducing identification information provided by the other communication device.

14. A system comprising:
  a first communication device comprising:
    a first communication interface configured to communicate with another communication device via a communication connection;
    a first processor configured to:
      receive or acquire, via a first interface unit and a first secure communication path being physically and/or logically separated from the communication connection, secure access information provided by the other communication device;
      establish, based on the secure access information, a secure communication link to the other communication device on the communication connection to the other communication device;
      transfer local private encoding data to the other communication device via the secure communication link on the communication connection, and
  a second communication device comprising:
    a second communication interface configured to communicate with another communication device via a communication connection; and
    a second processor configured to provide secure access in a manner that the secure access information is adapted for transmission to the other communication device via a second interface unit and the first secure communication path and configured to receive local private encoding data from the other communication device via the secure communication link on the communication channel.

15. A computer program product stored on a non-transitory computer readable storage medium including program code configured to, when executed by a computing device, to at least:

provide secure access information by a second communication device having a second interface unit;

transmit the secure access information from the second communication device to a first communication device having a first interface unit via a first secure communication path, the first secure communication path comprising the second interface unit and the first interface unit and being physically and/or logically separated from the communication connection, wherein the transmitting comprises:

displaying or sending, by the second interface unit, of the secure access information and acquiring or receiving, by the first interface unit, of the secure access information;

establish, based on the secure access information, a secure communication link between the first communication device and the second communication device on the communication connection between the first communication device and the second communication device; and transfer the local private encoding data via the secure communication link on the communication channel.

* * * * *